United States Patent [19]

Collette et al.

[11] Patent Number: 5,759,656
[45] Date of Patent: Jun. 2, 1998

[54] METHOD OF FORMING MULTILAYER PREFORM AND CONTAINER WITH LOW CRYSTALLIZING INTERIOR LAYER

[75] Inventors: Wayne N. Collette; Steven L. Schmidt, both of Merrimack; Suppayan M. Krishnakumar, Nashua, all of N.H.

[73] Assignee: Continental PET Technologies, Inc., Florence, Ky.

[21] Appl. No.: 858,132

[22] Filed: May 19, 1997

Related U.S. Application Data

[62] Division of Ser. No. 415,149, Mar. 31, 1995, which is a continuation of Ser. No. 82,171, Jun. 30, 1993, abandoned, which is a continuation-in-part of Ser. No. 909,961, Jul. 7, 1992, abandoned.

[51] Int. Cl.[6] .............................. B65D 1/08; C08G 63/16
[52] U.S. Cl. ...................... 428/36.91; 528/272; 528/302; 528/307; 528/308; 528/308.6; 525/437; 428/35.7; 428/36.91
[58] Field of Search .......................... 528/272, 302, 528/307, 308, 308.6; 525/437; 428/35.7

[56] References Cited

U.S. PATENT DOCUMENTS

| | | |
|---|---|---|
| 4,334,627 | 6/1982 | Krishnakumar et al. . |
| 4,618,386 | 10/1986 | Yatsu et al. .............................. 156/242 |
| 4,710,118 | 12/1987 | Krishnakumar et al. . |
| 4,713,269 | 12/1987 | Jabarin et al. ............................ 428/35 |
| 4,725,464 | 2/1988 | Collette et al. . |
| 4,755,404 | 7/1988 | Collette . |
| 4,818,575 | 4/1989 | Hirata et al. . |
| 4,863,046 | 9/1989 | Collette et al. . |
| 5,066,528 | 11/1991 | Krishnakumar et al. . |
| 5,115,047 | 5/1992 | Hashimoto et al. . |
| 5,191,987 | 3/1993 | Niimi et al. . |

*Primary Examiner*—Samuel A. Acquah
*Attorney, Agent, or Firm*—Wolf, Greenfield & Sacks, P.C.

[57] ABSTRACT

A method of forming a multi-layer polyester preform and container, particularly suitable for refillable PET carbonated beverage bottles, having an interior layer of high copolymer polyester material which resists hazing in the preform injection stage, and at least one exterior layer of a polyester to achieve enhanced strain-induced crystallization in the exterior layer during blow molding. The container can withstand higher caustic wash temperatures and exhibits reduced flavor carryover from one product to another.

18 Claims, 3 Drawing Sheets

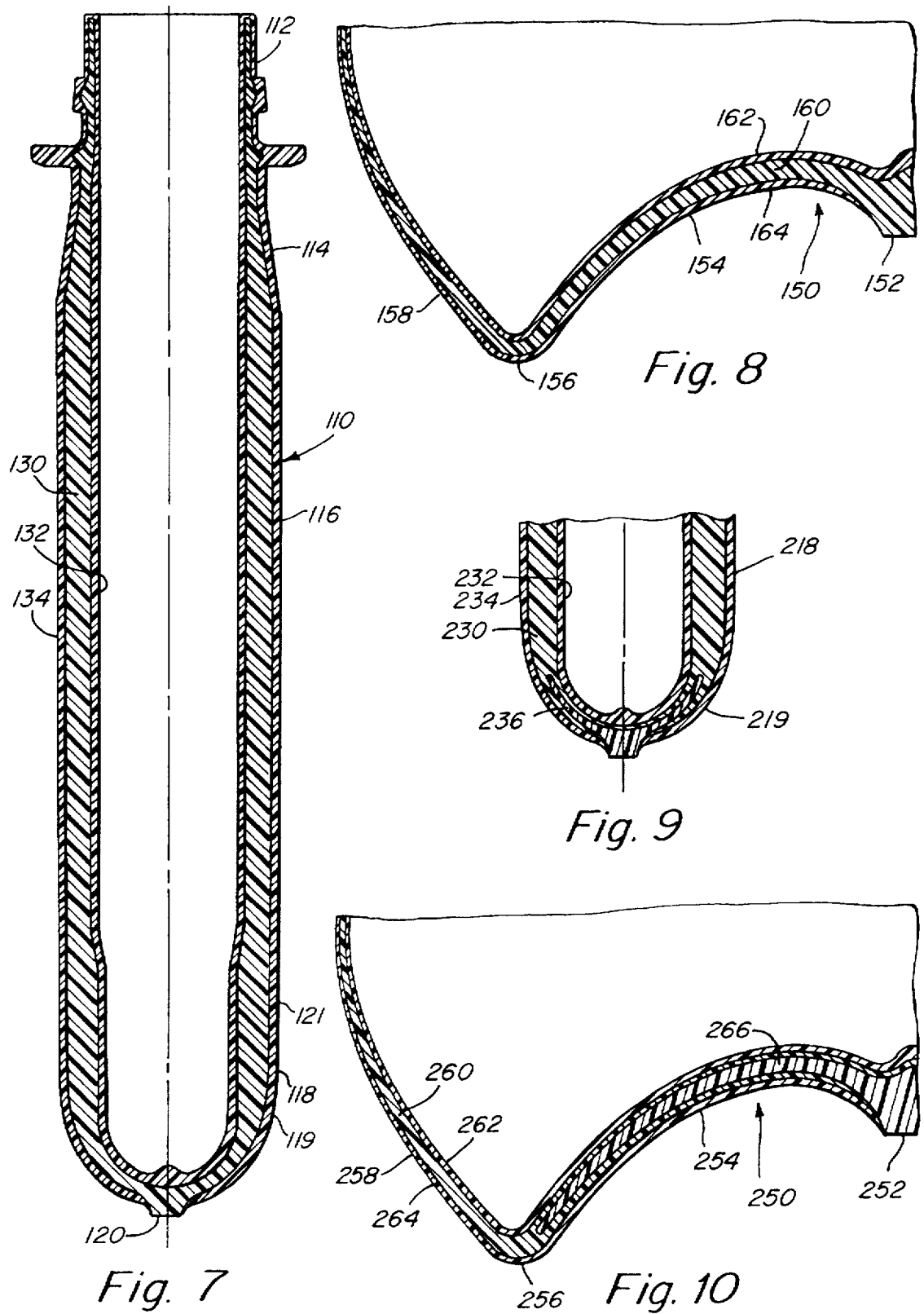

METHOD OF FORMING MULTILAYER PREFORM AND CONTAINER WITH LOW CRYSTALLIZING INTERIOR LAYER

RELATED APPLICATIONS

This application is a divisional application under 37 CFR 1.60, of pending prior application Ser. No. 08/415,149 filed on Mar. 31, 1995 and entitled METHOD OF FORMING MULTILAYER PREFORM AND CONTAINER WITH LOW CRYSTALLIZING INTERIOR LAYER, which is a continuation of U.S. Ser. No. 08/082,171 filed Jun. 30, 1993, now abandon which is a continuation-in-part of U.S. Ser. No. 07/909,961 filed Jul. 7, 1992 now abandon.

FIELD OF THE INVENTION

This invention relates to new and useful improvements in containers, and more particularly to a method of forming a container having an enhanced level of surface sidewall crystallinity, while maintaining a high level of transparency (clarity). The container is particularly useful as a refillable carbonated beverage container, able to withstand high caustic wash temperatures and exhibit reduced product flavor carryover, and as a hot-fill container.

BACKGROUND OF THE INVENTION

The market for PET refillable carbonated soft drink (CSD) bottles has enjoyed significant growth worldwide since its introduction in 1987 by Continental PET Technologies. These bottles have been commercialized throughout much of Europe, Central and South America, and are now moving into the Far East market.

Refillable bottles reduce the existing landfill and recycle problems associated with disposable plastic beverage bottles. In addition, a refillable bottle provides a safer, lighter-weight plastic container in those markets, currently dominated by glass, where legislation prohibits use of non-returnable packages. The goal is to produce a refillable bottle having the necessary physical characteristics to withstand numerous refill cycles, and which is still economical to produce.

Generally, a refillable plastic bottle must maintain its functional and aesthetic features over a minimum of 10 and preferably over 20 cycles or loops to be considered economically feasible. A loop is comprised of (1) an empty hot caustic wash followed by (2) contaminant inspection and product filling/capping, (3) warehouse storage, (4) distribution to wholesale and retail locations and (5) purchase, use and empty storage by the consumer followed by eventual return to the bottler. This cycle is illustrated in FIG. 1. In an alternative cycle, the contaminant inspection occurs before the caustic wash.

Refillable containers must meet several key performance criteria to achieve commercial viability, including:

1. high clarity (transparency) to permit visual on-line inspection;
2. dimensional stability over the life of the container; and
3. resistance to caustic wash induced stress cracking and leakage.

A commercially successful PET refillable CSD container is presently being distributed by The Coca-Cola Company in Europe (hereinafter "the prior art container"). This container is formed of a single layer of a polyethylene terephthalate (PET) copolymer having 3-5% comonomer, such as 1,4-cyclohexanedimethanol (CHDM) or isophthalic acid (IPA). The preform, from which this bottle is stretch blow molded, has a sidewall thickness on the order of 5-7 mm, or about 2-2.5 times that of a preform for a disposable one-way bottle. This provides a greater average bottle sidewall thickness (i.e., 0.5-0.7 mm) required for abuse resistance and dimensional stability, based on a planar stretch ratio of about 10:1. The average crystallinity in the panel (cylindrical sidewall section beneath the label) is about 15-20%. The high copolymer content prevents visual crystallization, i.e., haze, from forming in the preform during injection molding. Preform haze is undesirable because it produces bottle haze which hinders the visual on-line inspection required of commercial refill containers.

Various aspects of this prior art container are described in Continental PET Technology's U.S. Pat. Nos. 4,725,464, 4,755,404, 5,066,528 and 5,198,248.

The prior art container has a demonstrated field viability in excess of 20 refill trips at caustic wash temperatures of up to 60° C. Although successful, there exists a commercial need for an improved container that permits an increase in wash temperature of greater than 60° C., along with a reduction in product flavor carryover. The latter occurs when flavor ingredients from a first product (e.g., root beer) migrate into the bottle sidewall and subsequently permeate into a second product (e.g., club soda) on a later fill cycle, thus influencing the taste of the second product. An increase in wash temperature may also be desirable in order to increase the effectiveness and/or reduce the time of the caustic wash, and may be required with certain food products such as juice or milk.

Thus, it would be desirable to increase the caustic wash temperature above 60° C. for a returnable bottle having a lifetime of at least 10 refill trips, and preferably 20 refill trips, and to reduce the product flavor carryover. These and other objects are achieved by the present invention as set forth below.

SUMMARY OF THE INVENTION

In accordance with this invention, a method of forming a substantially transparent multi-layer container is provided having an enhanced level of strain-induced exterior sidewall crystallinity, and which may be further enhanced by low-temperature heat-setting. The container has improved resistance to caustic stress cracking, while maintaining a high level of transparency and dimensional stability, and thus is particularly suitable for refillable carbonated beverage bottles. The container has a lifetime of at least 10 refill cycles and more preferably at least 20 refill cycles, at caustic washing temperatures of 60° C. and above. The container exhibits a reduction in flavor carryover of at least 20% over the previously described refillable CSD prior art container.

In one embodiment, a multi-layer preform is provided including a panel-forming portion having an interior layer of a first copolymer polyester, and an exterior layer of a second polyester having relatively less copolymer and a rate of crystallization at least about 20% higher than the first polyester. Preferably, the interior layer forms a high copolymer core between two exterior (inner and outer) layers of the low copolymer. The high copolymer prevents crystallization (haze) of the interior core layer, which cools more slowly during the injection process, in order to preserve overall container clarity and inspectability. The exterior (inner and outer) layers cool more rapidly during the injection process and are less likely to crystallize. They are made of a homopolymer or low copolymer polyester which has a higher rate of stretching or strain-induced crystallization and thus provides enhanced surface resistance to caustic induced stress cracking and reduced flavor carryover in the blown container. The core layer may typically comprise about 50-80% of the wall thickness of the panel-forming portion of the preform, and of the corresponding panel portion of the container, and more preferably about 60-70%.

In one embodiment, the above preform is reheat stretch blow molded to form a one-piece PET free-standing refillable pressurized beverage container having biaxially oriented, relatively thin and highly crystalline inner and outer layers in the panel. The panel has a total average wall thickness of about 0.5 to about 0.8 mm, with the core comprising about 60-70% of the total. The container base includes a thickened base portion of lower orientation and crystallinity. The inner and outer layers of the panel have a strain-induced average crystallinity of at least about 20%, and the panel core layer at least about 14%, given a planar stretch ratio of about 7-13:1, and more preferably 9-11:1. By "average" crystallinity is meant an average taken over the entire area of the respective panel part, e.g., panel.

The multilayer PET container is provided with at least 20% strain-induced average crystallinity in the panel, which may be further enhanced by low-temperature heat-setting (e.g., in contact with a mold at a mold temperature of 110°-140° C. in order to retain transparency) to levels of 30-35%, or even greater. The higher the crystallinity level in the exterior layer of the panel, the higher the allowable wash temperature, e.g., 62° C., 65° C. or 70° C. The core layer in the panel has a much lower crystallinity, but is sufficient to provide the necessary strength (creep resistance, abuse resistance and thermal stability) for a viable refill container. Overall, the container of this invention can be washed at 60° C. or higher temperatures and exhibits reduced flavor carryover (20% improvement or more) with no significant loss of container properties, versus the prior art single-layer refillable CSD beverage bottle previously described.

The above two-material three-layer PET preform may be made by a metered sequential co-injection process comprising a first injection of a homopolymer or low copolymer, e.g., 0-2% copolymer content by total weight, to form the inner and outer layers, followed by a second injection of a high copolymer, e.g., 4-6% copolymer content by total weight, to form the core layer. In other examples, the copolymer may be less than 3% and the high copolymer more than 3% copolymer, as long as there is at least a 20% difference in crystallization rate.

The improved resistance to hazing and stress crack resistance at elevated temperatures makes the container of this invention also particularly suitable as a hot-fill container.

These and other features of the invention will be more particularly described by the following detailed description and drawings of certain embodiments.

BRIEF DESCRIPTION OF THE DRAWINGS

FIG. 7 is an enlarged sectional view of the multi-layer preform used to make the container of this invention;

FIG. 8 is an enlarged fragmentary view showing in cross section the base of a container made from the preform of FIG. 7;

FIG. 9 is a fragmentary sectional view of an alternative embodiment of the preform having a third injection of material in the base-forming section of the preform which displaces the core material, and which may be a low copolymer material similar to the inner and outer layers; and FIG. 10 is an enlarged fragmentary view showing in cross section the base portion of a container made from the preform of FIG. 9.

DETAILED DESCRIPTION

Figure 1:
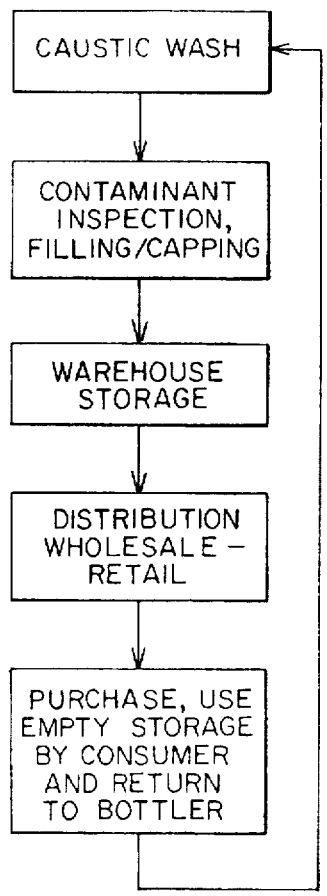
FIG. 1 is a schematic illustration showing a typical cycle or loop through which a refillable container must pass.

Referring now to the drawings, and in particular FIG. 1, a commercial refillable container must withstand numerous refill cycles while maintaining its aesthetic and functional features. A test procedure for simulating such a cycle would be as follows. As used in the specification and claims, the ability to withstand a designated number of refill cycles without crack failure and/or with a maximum volume change is determined according to the following test procedure.

Each container is subjected to a typical commercial caustic wash solution prepared with 3.5% sodium hydroxide by weight and tap water. The wash solution is maintained at the designated wash temperature, i.e., 60° C. or more, in accordance with this invention. The bottles are submerged uncapped in the wash for 15 minutes to simulate the time/temperature conditions of a commercial bottle wash system. After removal from the wash solution, the bottles are rinsed in tap water and then filled with a carbonated water solution at 4.0±0.2 atmospheres (to simulate the pressure in a carbonated soft drink container), capped and placed in a 38° C. convection oven at 50% relative humidity for 24 hours. This elevated oven temperature is selected to simulate longer commercial storage periods at lower ambient temperatures. Upon removal from the oven, the containers are emptied and again subjected to the same refill cycle, until failure.

A failure is defined as any crack propagating through the bottle wall which results in leakage and pressure loss. Volume change is determined by comparing the volume of liquid the container will hold at room temperature, both before and after each refill cycle. The container of FIG. 2, described below, can withstand at least 20 refill cycles at a wash temperature of greater than 60° C. without failure, and with no more than about 1.5% volume change after 20 cycles. The container also exhibits at least a 20% reduction in product flavor carryover (compared to the prior art CSD bottle) as determined by gas chromatography mass spectrometer measurements.

Figure 2:
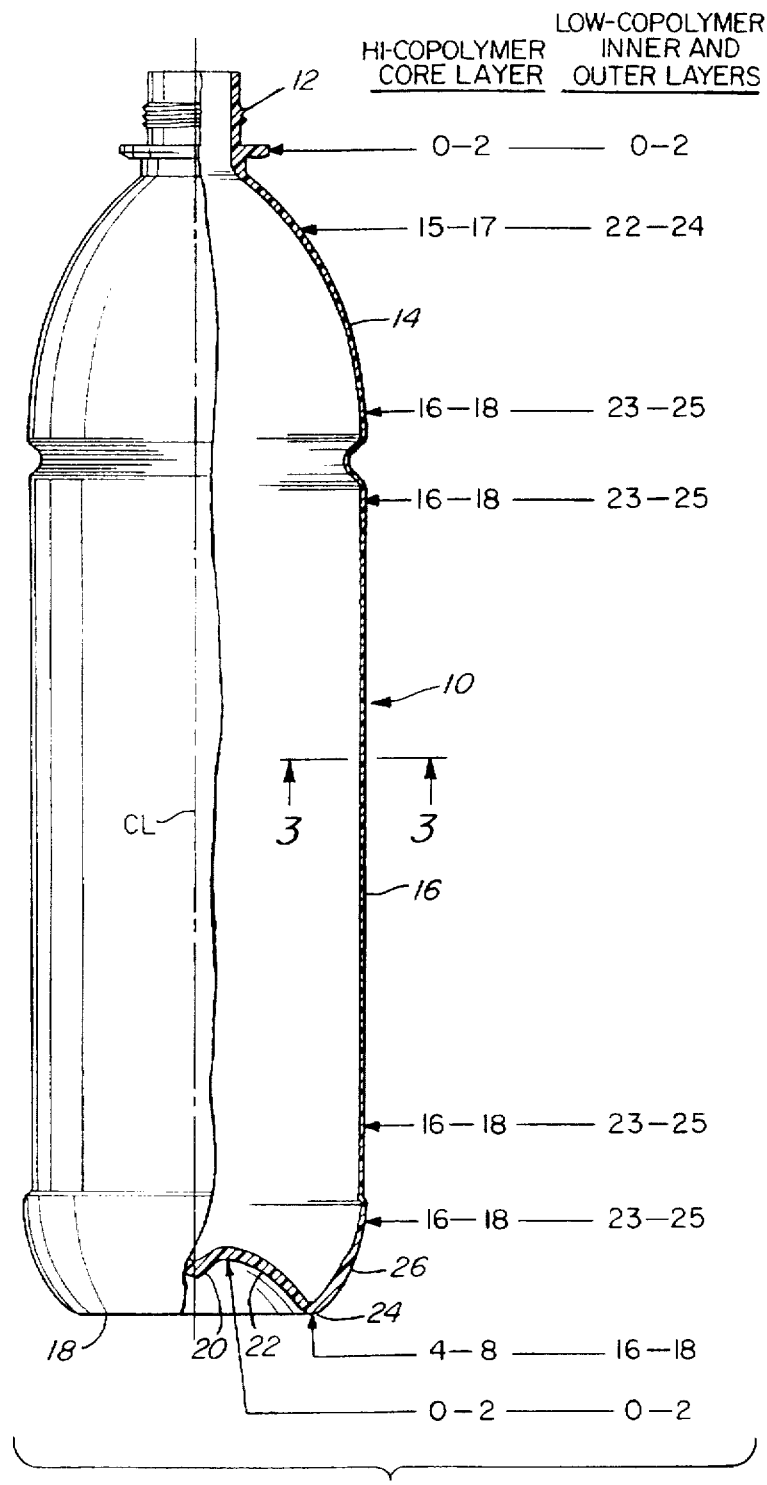
FIG. 2 is a schematic elevational view of a PET refillable 1.5 liter carbonated beverage bottle of this invention, partially broken away, and showing the varying levels of crystallinity in the high-copolymer core versus low-copolymer inner and outer layers, at various positions along the bottle.

FIG. 2 shows a PET refillable 1.5 liter carbonated beverage bottle having a relatively thick champagne base, made in accordance with this invention. The bottle 10 is a unitary blow-molded, biaxially-oriented hollow body having an open upper end with external screw threads on neck finish 12 for receiving a screw-on cap (not shown), and a lower closed base 18. Between the neck finish and base is a substantially vertically-disposed sidewall including an upper tapered shoulder portion 14, and a substantially cylindrical panel portion 16 (defined by vertical axis or centerline CL of the bottle). The champagne base 18 has a central outwardly-concave dome 22 with a center gate portion 20, an inwardly concave chime area 24 including a standing ring on which the bottle rests, and a radially increasing and arcuate outer base portion 26 for a smooth transition to the sidewall 16. The chime is a substantially toroidal-shaped area around the standing ring which is thickened to resist stress cracking. The dome and chime form a thickened base portion, which is about 3–4× the thickness of the panel 16. Above the chime, there is a thinner outer base portion of about 50–70% of the thickness of the thickened base portion and increasing in crystallinity up to its junction with the sidewall. The thinner outer base wall provides improved impact resistance.

Figure 3:
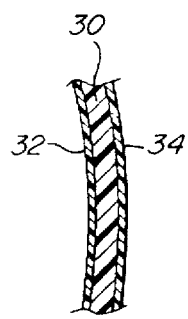
FIG. 3 is an enlarged fragmentary view taken along the section lines 3—3 of FIG. 2 showing more specifically the central core layer of high-copolymer PET, and the inner and outer layers of low-copolymer PET.

The multi-layer sidewall of bottle 10 is not specifically illustrated in FIG. 2 due to the small scale of the drawing. FIG. 3 shows in cross section the sidewall of the panel portion 16 having a high copolymer core layer 30 and inner and outer low copolymer layers 32 and 34, respectively. The core layer 30 is about 0.015–0.024 inch (.38–.61 mm) thick and the inner and outer layers 32 and 34 are each about 0.003–0.006 inch (.077–.15 mm) thick, based on a preform having a sidewall thickness of about 0.24 inch (6.1 mm) and a planar stretch ratio of about 10:1. The container is about 13.2 inch (335 mm) in height and about 3.6 inch (92 mm) in (widest) diameter.

A preform for making the container of FIG. 2 has a panel-forming wall thickness of about 0.24 in (6.1 mm), wherein the panel 16 is stretched at an average planar stretch ratio of about 10:1. The planar stretch ratio is the ratio of the average thickness of the panel-forming portion of the preform to the average thickness of the panel in the bottle. A preferred planar stretch ratio for polyester refill carbonated beverage bottles of about 0.5 to 2.0 liters/volume and about 0.5 to 0.8 mm panel wall thickness is about 7–15:1, and more preferably about 9–11:1. The hoop stretch is preferably 3–3.6:1 and the axial stretch 2–3:1. This produces a container panel with the desired abuse resistance, and a preform sidewall with the desired visual transparency. The panel thickness and stretch ratio selected depend on the dimensions of the specific bottle, the internal pressure (e.g., 2 atm for beer, 4 atm for soft drinks), and the processing characteristics of the particular material (as determined for example, by the intrinsic viscosity).

The varying percent crystallinity at various positions along the bottle from the neck finish to the base is listed in FIG. 2. The percent crystallinity is determined according to ASTM 1505 as follows:

$$\% \text{ crystallinity} = [(ds-da)/(dc-da)] \times 100$$

where ds=sample density in g/cm$^3$, da=density of an amorphous film of zero percent crystallinity (for PET 1.333 g/cm$^3$), and dc=density of the crystal calculated from unit cell parameters (for PET 1.455 g/cm$^3$).

As shown in FIG. 2, the crystallinity in the neck finish 12, across both the core and inner and outer layers, is very low (0–2%) because this portion of the bottle undergoes substantially no expansion. The tapered shoulder portion 14, which undergoes less expansion than the panel section 16, achieves 15–17% strain-induced crystallinity in the core, and 22–24% in the inner and outer layers. In the highly-stretched panel section 16, there is 16–18% strain-induced crystallinity in the core, and 22–25% in the inner and outer layers. In the relatively thick sections at the gate 20 and recess 22 portions of the base where there is relatively less expansion, again there is from 0–2% strain-induced crystallinity in both the core and inner and outer layers. In the chime area 24, a strain-induced crystallinity of 4–8% is provided in the core, and 16–18% in the inner and outer layers.

Alternatively, further enhanced levels of crystallinity can be achieved by heat setting (thermal-induced crystallinity at low temperatures to preserve transparency, e.g., in contact with a mold at a mold temperature of 110°–140° C. for PET), for a combination of strain-induced and thermal-induced crystallization. For example, a combined average panel crystallinity of 30–35% allows a wash temperature of at least 62° C. and 20 cycles, along with at least 20% reduction in flavor carryover. Generally, the strain-induced crystallinity tends to be substantially uniform across the thickness of the particular layer, while thermal-induced crystallinity may exhibit a gradient across the wall. In this invention, a high level of crystallinity at the surface of the sidewall alone is sufficient, although typically a substantially constant average level of crystallinity is achieved across the respective layer.

The blown container should be substantially transparent based on the percent crystallinity as previously defined. Another measure of transparency is the percent haze for transmitted light through the wall ($H_T$) which is given by the following formula:

$$H_T = [Y_d \div (Y_d + Y_s)] \times 100$$

where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The refill container should have a percent haze (through the wall) of less than about 15%, more preferably less than about 10%, and still more preferably less than about 5%.

The high copolymer PET forming the core layer 30 preferably contains about 4–6% by total weight of a comonomer such as 1,4-cyclohexanedimethanol (CHDM) and/or isophthalic acid (IPA). The low copolymer PET for the inner and outer layers 32, 34 preferably contains about 0–2% by total weight of comonomer, such as CHDM and/or IPA. These materials are commercially available from Eastman Chemical in Kingsport, Tenn., and Goodyear Tire & Rubber Co. in Akron, Ohio. The comonomer (e.g., CHDM as a replacement for the glycol moitey, or IPA as a replacement for the acid moitey) disrupts the PET polymer backbone (i.e., alternating units of acid and gylcol) to decrease the molecular crystallization rate. The comonomer is most effective if it forms part of the backbone, but may also form a branched copolymer.

The bottle is preferably made via a two-stage preform injection and subsequent reheat blow process. Generally, the portions of the bottle which are stretched (at the appropriate temperature) the greatest exhibit the greatest amount of crystallinity across the sidewall. Furthermore, the varying levels of copolymer in the multi-layer sidewall (see FIG. 3), produce a variation in crystallinity, with the high copolymer core layer 30 exhibiting a lower crystallinity than the low copolymer inner and outer layers 32, 34. This is because increasing the copolymer content decreases the molecular crystallization rate at a given temperature.

One measure of the crystallization rate is to determine $\Delta T$ from the crystallization curve obtained by Differential Scanning Calorimetry (DSC), i.e., $\Delta T=T_{ie}-T_p$, where $T_p$ is the crystallization peak temperature, $T_i$ is the initial crystallization temperature (onset) and $T_{ie}$ is the extrapolated initial temperature obtained at the intercept of tangents to the baseline on the high temperature side of the exothermic peak. This technique is well known as described in H. N. Beck and H. D. Ledbetter, *J. Appl. Polym. Sci.*, 9, 2131 (1965) and in Saleh A. Jabarin, "Resin and Process Parameters Affecting Crystallization of PET Preforms," BEV-PAK '92 Sixteenth International Ryder Conference on Beverage Packaging, Mar. 23–25, 1992, FIGS. 6–11, which are hereby incorporated by reference in their entirety. The quantity $\Delta T$ is a function of the overall rate of crystallization and the smaller the $\Delta T$, the greater the rate of crystallization. For PET, a high copolymer is generally considered to have a $\Delta T$ (as determined at a cooling rate of 5° C./min. from 300° C. to below $T_g(80°$ C.)) of 21.5° C. and above, and a low copolymer below 21N5 CN Preferrably, there is a difference in $\Delta T$ between the high and low copolymer layers of this invention of at least about 20%, e.g., a high copolymer $\Delta T$ of about 24 and a low copolymer $\Delta T$ of about 20.

The preform from which the bottle is blown should be substantially amorphous, which for PET means up to about 10% crystallinity, preferably no more than about 5% crystallinity, and more preferably no more than about 2% crystallinity.

Alternatively, the substantially amorphous or transparent nature of the preform can be determined by the percent haze. The percent haze across the wall of the preform should be no more than about 20%, preferably no more than about 10%, and more preferably no more than about 5%.

The substantially amorphous preform is then expanded which produces orientation and crystallization in the sidewall of the container. The preform may be expanded into a container by any conventional technique involving distension of the preform, such as by vacuum or pressure forming. Two well-known processes are the integrated injection blow process, and the two-stage preform injection and subsequent reheat blow process.

The distension step should be carried out at a temperature in the molecular orientation temperature range for the polyester material being employed. Generally speaking, molecular orientation of an orientable thermoplastic material occurs over a temperature range varying from just above the glass transition temperature (that temperature or narrow temperature range below which the polymer is in a glassy state) up to just below the melt temperature of the polymer. As a practical matter, the formation of oriented containers is carried out in a much narrower temperature range, known as the molecular orientation temperature range. The reason is that when the temperature is too close to the glass transition temperature, the material is too stiff to stretch in conventional processing equipment. When the temperature is increased, the processability improves greatly but a practical upper limit is reached at or near the temperature at which large aggregates of crystallites called spherulites begin to form, because the orientation process is adversely affected by spherulite growth. For substantially amorphous polyester material, the molecular orientation range is typically from about 20° to 65° F. (11° to 36° C.), and more preferably from about 30° to 40° F. (17°–22° C.), above the glass transition temperature of the polyester material. Typical amorphous PET polymer, which has a glass transition temperature of about 168° F. (76° C.), generally has an orientation temperature range of about 195° F. (91° C.) to about 205° F. (96° C.).

In the preferred reheat stretch blow process, the hot injected preform is quenched to room temperature before use and then the preform is reheated to within the orientation temperature range before the distension step. The reheated preform is positioned in a stretch blow assembly wherein a stretch rod is moved into the open end of the preform and extended to draw the preform end against a base of an internal cavity blow mold, thereby axially stretching the preform sidewall, and simultaneously or sequentially a blowing medium is admitted into the interior of the preform through openings in or around the rod to radially stretch the preform outwardly to conform to the inner surface of the mold. The extent of stretching can be varied depending on the desired shape and wall thickness of the blown container and is controlled by affixing the relative dimensions of the initial preform and the finished container.

In the alternative integrated process, the hot injected preform is partially quenched and allowed to equilibriate within the orientation temperature range prior to distending by a suitable blow or combined stretch/blow apparatus similar to that previously described.

Figure 4:
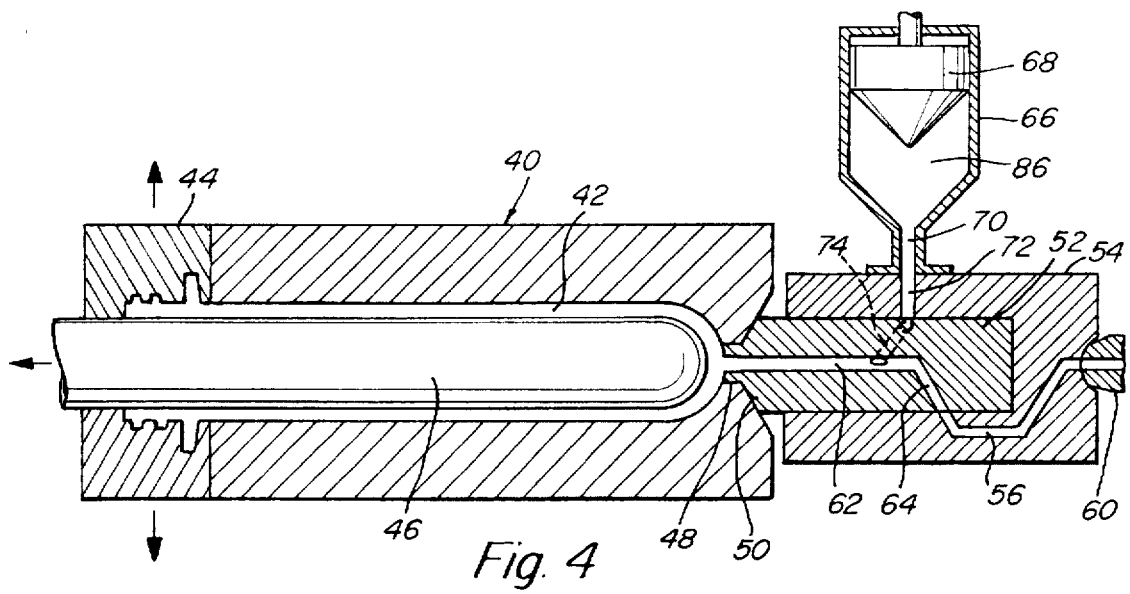
FIG. 4 is a schematic sectional view taken through an injection mold cavity and showing the manner in which the polyester resin material is directed into the cavity to form a preform in accordance with this invention.
Figure 5:
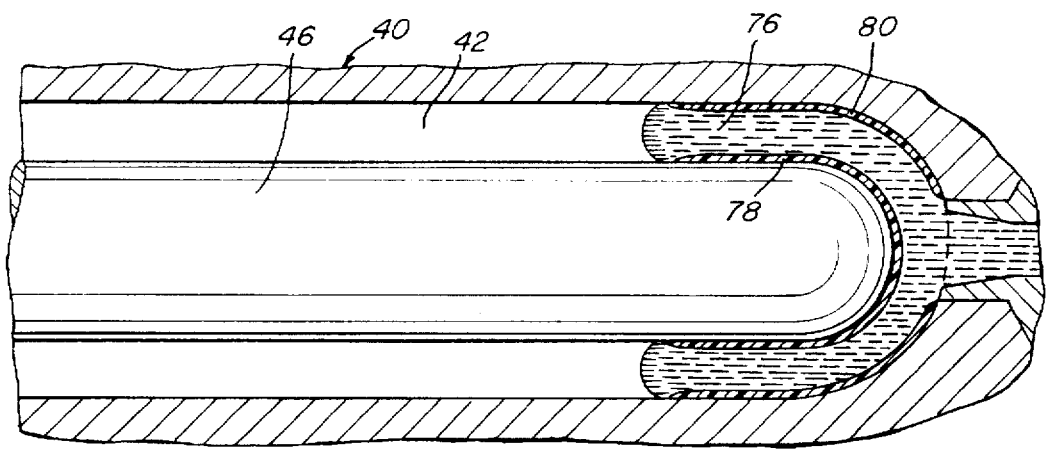
FIG. 5 is an enlarged fragmentary schematic view showing the manner in which a quantity of a first low copolymer material is injected into the bottom of the mold cavity and the resultant cooling upon contact with the cooler mold wall surfaces in order to form the inner and outer layers of the preform.
Figure 6:
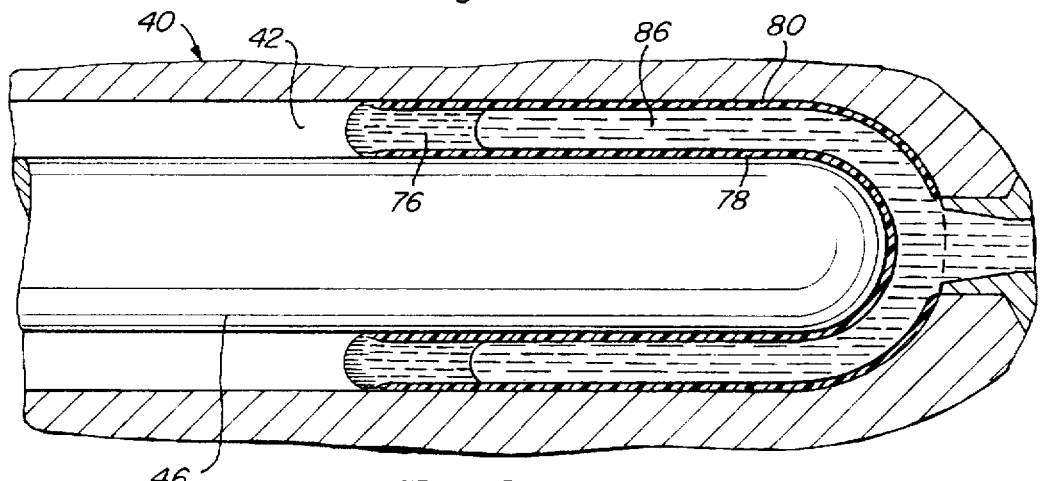
FIG. 6 is an enlarged fragmentary schematic view showing the manner in which a quantity of a second high copolymer material is injected into the bottom of the mold cavity to form the core layer and the resultant tunnel flow of both the first and second materials to form the preform.

FIGS. 4–6 illustrate a metered, sequential co-injection apparatus for making a multi-layer preform of this invention. This apparatus is substantially described in U.S. Pat. No. 4,710,118 to Krishnakumar et al. granted Dec. 1, 1987, which is hereby incorporated by reference in its entirety.

As shown in FIG. 4, an injection mold unit 40 includes an outer mold cavity 42, a neck ring 44 which defines the neck finish, and a core 46. The neck ring 44 in conjunction with the core 46 closes the upper end of the mold cavity 42 while the lower end is provided with an opening 48 which receives in sealed relation a nozzle-like end 50 of a rotary valve member 52 of the extruder. The valve member 52 is mounted in sealed relation within a valve block 54 which has formed therein a first passage 56 which receives a conventional nozzle 60 of a plasticizer or injection head. The passage 56 opens radially toward the rotary valve member 52, and the latter has a through passage 62 which at one end terminates in a generally radial passage 64 which can be aligned with the passage 56. There is also associated with the valve block 54 a second material dispenser 66 which includes a dispensing piston 68 and a flow passage 70 exiting therefrom toward the valve block 54. The valve block 54 has a radial passage 72 which is axially aligned with and in communication with the passage 70. The valve member 52 has a further passage 74 extending generally radially from the passage 62 and so circumferentially spaced from the passage 64 such that when the passage 64 is aligned with the passage 56, the passage 74 is spaced from the passage 72. By rotating the valve member 52, the passage 64 may be moved out of communication with the passage 56 and the passage 74 moved into communication with the passage 72. Thus, material may be selectively supplied from either the first supply device (injection head) 60 or from the second supply device 66.

In accordance with the preferred embodiment, the material delivered by the first supply device 60 will be the low copolymer PET for the inner and outer layers. The material supplied by the second supply device 66 will be the high copolymer PET for the core layer.

Referring to FIG. 5, it will be seen that a preselected amount of a first low copolymer resin 76 will be injected into the bottom of the mold cavity 42 and as it flows through the mold cavity, due to the relatively cool temperature of the mold unit 40 including the core 46, there will be solidification of the resin 76 to define exterior inner and outer layers 78, 80 of the first material.

As is schematically shown in FIG. 6, the high copolymer core material 86 is next injected into the mold cavity. It will be seen that the core material 86 will have a tunnel flow through the cavity defined between the layers 78, 80 and at the same time will advance the previously injected material 76. The interior core material cools more slowly because it does not contact the cooler mold walls, but because the core layer has a higher copolymer content, it resists hazing.

With respect to FIG. 7, a preform 110 is made as previously described, which includes a high copolymer core layer 130, a continuous low copolymer inner layer 132, and a low copolymer outer layer 134 which is continuous except for a portion of the core material which may extend through the outer layer at the gate area 120. The preform 110 includes an upper neck finish 112, a tapered shoulder-forming section 114 which increases in thickness from top to bottom, a panel-forming section 116 having a uniform wall thickness, and a base-forming section 118. Base section 118 includes an upper cylindrical thickened portion 121 of greater thickness than the panel section 116 and which forms a thickened chime in the container base, and a tapering lower portion 119 of reduced thickness for forming the recessed dome of the container. A preform having a preferred cross-section for refill applications is described in U.S. Pat. No. 5,066,528 granted Nov. 19, 1991 to Krishnakumar et al., which is hereby incorporated by reference in its entirety. The core layer 130 in the panel section 116 is roughly twice the thickness of each of the inner and outer layers 132 and 134, to form the preferred 1.5 liter bottle having the wall thickness previously described.

The blown container, as shown in FIG. 8, has a champagne-type base section 150 including a center gate portion 152, central recessed dome 154, chime 156, and outer base portion 158. The core layer 160 and inner and outer layers 162 and 164, respectively, vary in thickness along the base depending upon the relative amount of stretch the specific base portion has undergone, but generally the wall thickness decreases progressively while moving radially away from the gate 152.

FIG. 9 shows an alternative embodiment of a preform base-forming section 218, wherein a third injection of a low copolymer material is injected into at least a portion 236 of the base-forming section, and preferably into the reduced wall thickness lower base portion 219 which because it is less thick and cools more rapidly, is not as susceptible to hazing. Low copolymer section 236 displaces the core material 230 and preferably is of the same material as the inner and outer layers 232, 234 so that in the coinjection process previously described the nozzle is cleared of the high copolymer before the next preform is started to avoid injecting any high copolymer in the inner and outer layers of the next preform. As shown in FIG. 10, a champagne-type container base 250 blown from the preform of FIG. 9, includes a gate portion 252, dome 254, chime 256, and outer base 258. Across the wall, the base includes inner and outer layers 262 and 264, respectively, and core layer 260. The core layer 260 is displaced at least in part by the low copolymer in section 266 across the gate and recess areas.

The thermoplastic polyester materials used in this invention are preferably those based on polyalkylene, and in particular, polyethylene terephthalate (PET). PET polymers are prepared by polymerizing terephthalic acid or its ester-forming derivative with ethylene. The polymer comprises repeating units of ethylene terephthalate of the formula:

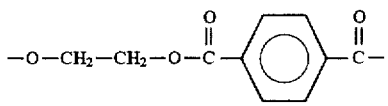

The present invention contemplates the use of copolymers of polyethylene terephthalate in which a minor proportion, for example, up to about 10% by weight, of the ethylene terephthalate units are replaced by compatible monomer units. Thus, as used herein "PET" means PET homopolymer and PET copolymers of the grades suitable for making containers, which are well known in the art. The glycol moiety of the monomer may be replaced by aliphatic or alicyclic glycols such as cyclohexanedimethanol (CHDM), trimethylene glycol, polytetramethylene glycol, hexamethylene glycol, dodecamethylene glycol, diethylene glycol, polyethylene glycol, polypropylene glycol, propane-1,3-diol, butane-1,4-diol, and neopentyl glycol, bisphenols, and other aromatic diols such as hydroquinone and 2,2-bis(4'-B-hydroxethoxyphenyl) propane. Examples of dicarboxylic acid moieties which may be substituted into the monomer unit include aromatic dicarboxylic acids such as isophthalic acid (IPA), phthalic acid, naphthalenedicarboxylic acid, diphenyldicarboxylic acid, diphenoxyethanedicarboxylic acids, bibenzoic acid, and aliphataic or alicyclic dicarboxylic acids such as adipic acid, sebacic acid, azelaic acid, decanedicarboxylic acid and cyclohexanedicarboxylic acid. In addition, various multifunctional compounds such as trimethylolpropane, pentaerythritol, trimellitic acid and trimesic acid can be copolymerized with the polyethylene terephthalate polymer.

The polyethylene terephthalate polymers may contain other compatible additives and ingredients which do not adversely affect the performance characteristics of the container, such as adversely affecting the taste or other properties of products packaged therein. Examples of such ingredients include thermal stabilizers, light stabilizers, dyes, pigments, plasticizers, fillers, antitoxidants, lubricants, extrusion aids, residual monomer scavengers and the like.

The intrinsic viscosity (I.V.) effects the processability of the polyester resins. Polyethylene terephthalate having an intrinsic viscosity of about 0.8 is widely used in the CSD industry. Resins for various applications may range from about 0.55 to about 1.04, and more particularly from about 0.65 to 0.85. Intrinsic viscosity measurements are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V.=(ln(V_{Soln}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

Other factors important in the manufacture of refillable polyester beverage bottles are described in U.S. Pat. No. 4,334,627 to Krishnakimer et al. granted Jun. 15, 1982, U.S. Pat. No. 4,725,464 to Collette granted Feb. 16, 1988, and U.S. Pat. No. 5,066,528 to Krishnakumar et al. granted Nov. 19, 1991, which are hereby incorporated by reference in their entirety.

As previously described, the plastic container of this invention is preferably made of polyethylene terephthalate (PET). However, other thermoplastic polyester resins may be used to achieve the multi-layer container of this invention, wherein an interior layer is provided having greater resistance to thermal-induced crystallization during an injection or similar heat-treating process, and wherein an exterior second layer achieves a higher strain and/or thermal-induced crystallization during a later blowing or expansion step in order to provide a higher level of surface crystallization. Additional layers may be provided, in addition to the core, inner and outer layers of the preferred embodiment, e.g., barrier (oxygen, carbon dioxide, light), high thermal stability, recycle PET or post-consumer PET or other layers. Different base structures may be used, such as a footed base having a substantially hemispherical bottom wall with a plurality of downwardly-extending legs terminating in lowermost supporting feet, and with radiating ribs (which are part of the bottom wall) between the legs. The materials, wall thicknesses, preform and bottle contours, and processing techniques may all be varied for a specific end product, while still incorporating the substance of this invention. The container may be for other pressurized or unpressurized beverages, such as beer, juice or milk, or for other non-beverage products. The benefits of the invention, for example the resistance to hazing and improved stress crack resistance at elevated temperatures, may be particularly suited for a hot-fill container, such as described in U.S. Pat. No. 4,863,046 to Collette et al. granted Sep. 5, 1989, which is hereby incorporated by reference in its entirety. Hot-fill containers typically must withstand elevated temperatures on the order of 180°–185° F. (the product filling temperature) and positive internal pressures on the order of 2–5 psi (the filling line-pressure) without substantial deformation (i.e., volume change of no greater than about 1%).

Thus, although several embodiments of this invention have been specifically illustrated and described herein, it is to be understood that variations may be made in the preform construction, materials, the container construction and the method of forming the container without departing from the spirit and scope of the invention as defined by the appended claims.

What is claimed is:

1. A container comprising a body having a substantially transparent biaxially-oriented multi-layer integral sidewall including an interior layer of a first copolymer polyester and at least one exterior layer of a second polyester, the second polyester having relatively less copolymer than the first polyester and a rate of crystallization at least 20% higher than the first polyester, the sidewall including a substantially cylindrical panel having an average strain-induced crystallinity of at least about 20% in the exterior layer and at least about 14% in the interior layer.

2. The container of claim 1, wherein the first polyester is of from about 4 to about 6% copolymer.

3. The container of claim 2, wherein the second polyester is no more than about 2% copolymer.

4. The container of claim 3, wherein the first and second polyesters are substantially polyethylene terephthalate (PET).

5. The container of claim 4, wherein the average crystallinity of the exterior layer of the panel is enhanced by thermal-induced crystallinity to at least about 30% while maintaining substantial transparency.

6. The container of claim 4, wherein the panel has a wall thickness of about 0.5 to about 0.7 mm.

7. The container of claim 6, wherein the panel has been expanded at a planar stretch ratio of about 7–13:1.

8. The container of claim 7, wherein the panel has been expanded at a planar stretch ratio of about 9–11:1.

9. The container of claim 1, wherein the interior layer is a core layer of about 50 to about 80% of the panel thickness.

10. The container of claim 4, wherein the container can withstand at least 10 refill cycles in a caustic wash at a temperature of above 60° C. without crack failure.

11. The container of claim 10, wherein the container can withstand at least 20 refill cycles in a caustic wash at a temperature of above 60° C. without crack failure.

12. The container of claim 11, wherein the container can withstand the designated refill cycles with a maximum volume change of about ±1.5%.

13. The container of claim 4, wherein the copolymer is selected from the group consisting of 1,4-cyclohexanedimethanol and isophthalic acid.

14. The container of claim 1, wherein the container is a free-standing pressurized PET beverage container.

15. The container of claim 1, wherein the container is a hot-fill container.

16. The container of claim 4, wherein the sidewall has a percent haze of no more than about 15%.

17. The container of claim 1, wherein the first and second polyesters are each bottle grade PET.

18. The container of claim 1, wherein the container includes a layer of a material selected from the group consisting of barrier, high thermal stability, recycle PET and post-consumer PET.

* * * * *